United States Patent [19]
Kromrey

[11] Patent Number: 5,306,448
[45] Date of Patent: Apr. 26, 1994

[54] METHOD FOR RESIN TRANSFER MOLDING

[75] Inventor: Robert V. Kromrey, Campbell, Calif.

[73] Assignee: United Technologies Corporation, Hartford, Conn.

[21] Appl. No.: 138,776

[22] Filed: Dec. 28, 1987

[51] Int. Cl.⁵ .................. B29C 43/10; B29C 43/18
[52] U.S. Cl. ................. 264/29.5; 264/257; 264/258; 425/405.2
[58] Field of Search .......... 427/350, 295, 296, 294; 264/102, 510, 511, 512, 257, 258, 320, 29.5; 425/405.1, 405.2

[56] References Cited

U.S. PATENT DOCUMENTS

| | | | |
|---|---|---|---|
| 3,666,600 | 5/1972 | Yoshino | 264/510 |
| 3,844,523 | 10/1974 | Wilheim | 425/113 |
| 4,311,661 | 1/1982 | Palmer | 264/510 |
| 4,409,048 | 10/1983 | Hatch et al. | 156/155 |
| 4,562,033 | 12/1985 | Johnson | 264/510 |
| 4,686,271 | 8/1987 | Beck et al. | 528/15 |

FOREIGN PATENT DOCUMENTS 233134 1/1987 European Pat. Off. .
808217 3/1956 United Kingdom .

Primary Examiner—Jay H. Woo
Assistant Examiner—Jeremiah F. Durkin

[57] ABSTRACT

A resin reservoir particularly adapted for use with a resin transfer molding process. This reservoir comprises a pressure yielding porous sponge containing about two to about ten times the sponge's weight in resin. The reservoir is used in a resin transfer molding process. The process comprises applying pressure to a pressure yielding porous sponge containing resin to transfer the resin to a porous article precursor. The resin reservoir facilitates resin transfer molding by providing a resin reservoir that can ensure the desired impregnation of a porous preform such as a dry fiber composite precursor.

8 Claims, 2 Drawing Sheets

METHOD FOR RESIN TRANSFER MOLDING

TECHNICAL FIELD

The field of art to which this invention pertains is molding apparatuses and methods, particularly resin transfer molding apparatuses and methods.

BACKGROUND ART

Composites are made by exposing fiber reinforced polymers to pressure and/or heat. Typically, fibers are first impregnated with polymer to form a prepreg and the prepreg is exposed to elevated temperatures and/or pressures to cure the composite. Alternatively, polymer can be impregnated into fiber layups under pressure and then cured in a resin transfer molding process Typically, a mold surrounds the fiber layup and resin is pumped into the mold whereupon pressure and sometimes heat is applied to "transfer" the polymer into the fiber layup. Typically, heat and pressure are applied to cure the polymer impregnated fibers. However, resin transfer molding can have problems For example, because the fiber layup acts as a filter, the transfer of the resin is inhibited, resulting in uneven resin distribution.

A variety of pressure transfer means are used to apply pressure to a reservoir of polymer in order to transfer the polymer into the mold cavity including pistons, pumps, etc One molding method is described in commonly assigned European Patent Application No. 87630010.4 entitled "Molding Method and Apparatus Using a Solid, Flowable, Polymer Medium" to Kromrey. An article is molded by contacting it with a solid polymer medium, such as an especially low strength unfilled silicone rubber which is solid and able to flow readily. Thermal expansion of the medium or mechanical force is used to create molding pressure and thereby provides a substantially uniform pressure on the article precursor. Various temperature and pressure cycles can be attained; constant high pressures can be maintained on the article precursor during cooldown, optionally aided by flowing of medium to and from a vessel in which the article precursor is being molded. The method is particularly adapted to molding filler or fiber reinforced thermosetting polymer composite articles.

Although there are a wide variety of molding techniques (e.g., resin transfer) there is a continual search for molding methods that produce denser, more uniform parts.

DISCLOSURE OF INVENTION

This invention is directed to a resin reservoir particularly adapted for use with a resin transfer molding process. This reservoir comprises a pressure yielding porous sponge containing about two to about ten times the sponge's weight in resin.

Yet another aspect of this invention is a method of resin transfer molding comprising applying pressure to a pressure yielding porous sponge containing resin to transfer the resin to a porous article precursor.

This invention facilitates resin transfer molding by providing a resin reservoir that can ensure the desired impregnation of a porous preform such as a dry fiber composite precursor. Thus, this invention makes a significant contribution to the field of resin transfer molding.

The foregoing, and other features and advantages of the present invention will become more apparent from the following description and accompanying drawings.

BEST MODE FOR CARRYING OUT THE INVENTION

Figure 1:
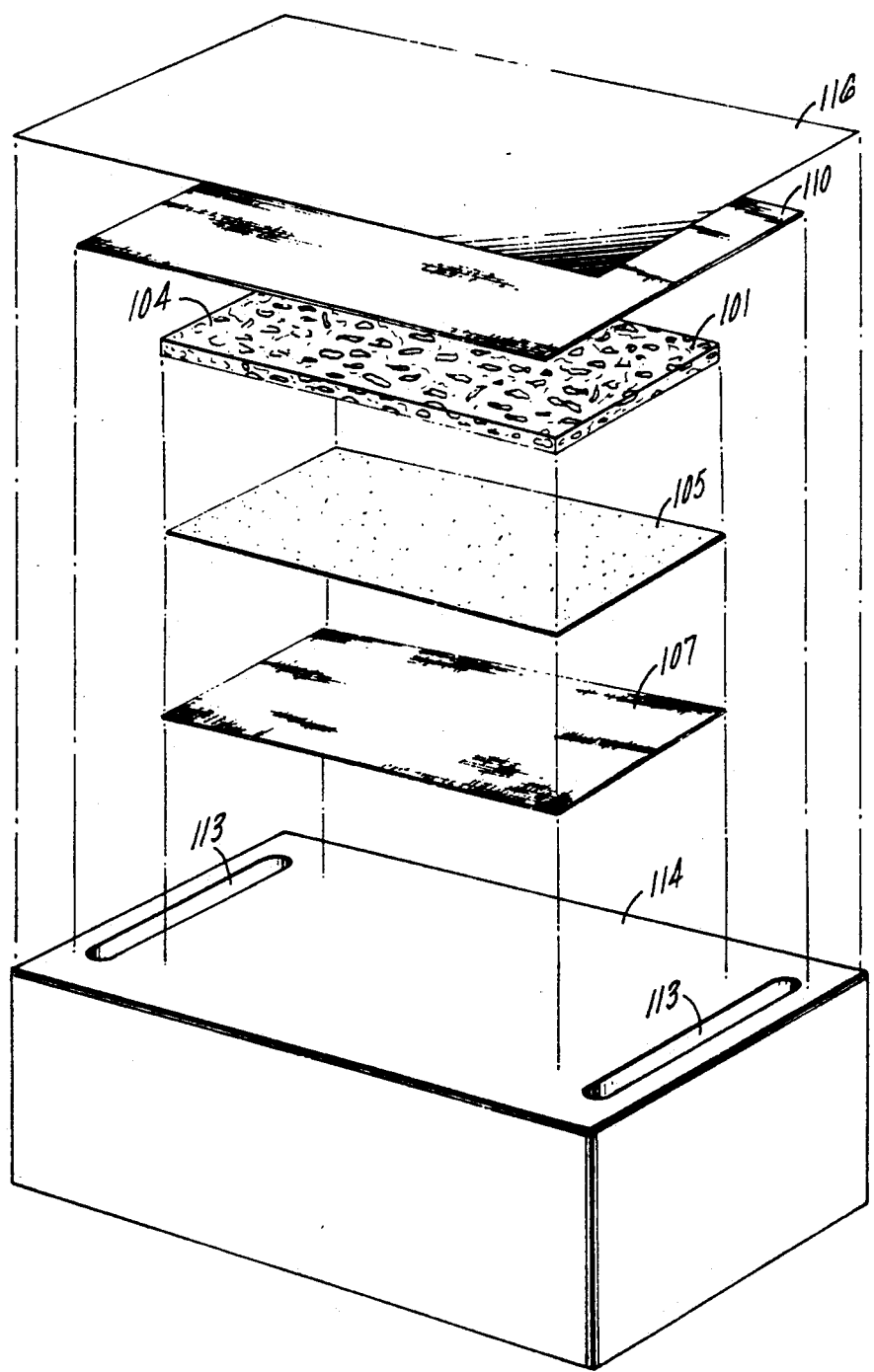
FIG. 1 illustrates an exploded perspective view of the resin transfer assembly of this invention.

A clearer understanding may be had by reference to FIG. 1. According to FIG. 1, pressure is applied to a porous sponge 101 that contains polymer 104 forcing the polymer 104 out of the blotter 101 and typically through a porous release material 105 and into the porous article 107 that is to be molded. A breather layer 110 may be disposed outside the porous sponge 101 and used to vent volatiles to a vent 113 in a tool 114. A vacuum bag 116 envelops the assembly The sponge material of this invention may be any pressure yielding porous sponge 101 (e.g., blotter, mat, open-celled foam) that yields to pressure and thus dispenses the liquid it contains Depending on the particular application, the pressures required to transfer the polymer may range from about 0.075 MPa (15 psi) to about 20.7 MPa (3000 psi). The degree of porosity in the sponge and also the thickness of the sponge determines the amount of polymer that can be transferred into the article to be molded depending on the application. Typically, the sponge holds about two to about ten times its weight in resin. The thickness should be appropriate for the amount of resin to be transferred while minimizing the amount of sponge material because excess resin trapped in the sponge is wasted. Typically, this is about 1.3 mm (50 mils) to about 25.4 cm (10 inches) and is dependent on the thickness of the article being impregnated. Preferably, the sponge is capable of transferring a substantially uniform pressure (e.g., pressure differentials less than about 10%).

Exemplary porous material types for this purpose include: felt, fabric, or nonwoven materials such as paper (e.g., resembling a blotter). Exemplary materials are open-cell foam sponge, cotton batting (e.g., cotton cheese cloth), nylon, fibrous carbon felt, polyester, dacron and various fibrous felt materials. An exemplary material is AIRWEAVE (TM) Polyester Padding (available from Airtech International (Carson, Calif.).

The sponge sheet stock is cut and placed over (or in) an article being impregnated (or reimpregnated). A uniform impregnation can be achieved by placing the desired thickness of sponge (and hence desired quantity of resin) next to the article to be molded. A controlled amount of preimpregnated sponge therefore will ensure proper saturation of a porous preform (e.g., composite precursor). The void volume of the article (e.g., composite) can be ascertained from its specific gravity. This allows an accurate measure for sizing of the preimpregnated sponge. When the impregnating resin is properly applied to the sponge, the resultant preimpregnated sponge would have a uniform resin content for a given area and thickness. The mixture is transferred from the preimpregnated sponge to the part during the impregnation operation.

After molding, the sponge is removed from the part. An exemplary release material separating the part from the sponge is ARMALON (TM) available from T.M.I. Inc., Salt Lake City, Utah. For certain applications (e.g., carbon-carbon) the temperatures used may be so high that the sponge is degraded, eliminating the need for separation from the part. Alternatively, the sponge (e.g., organic material) may decompose to carbon at high temperatures and pressures and thus become incorporated into the surface of the composite. Alternatively, the sponge may be peeled or machined from the part.

The above assembly may be contained within a vacuum bag (e.g., conventional film or silicone rubber bag) or a metal foil barrier which can withstand high temperatures. The bag typically covers vent holes in the tool on which the part is being made Typically, aluminum and copper foils or alloys thereof are used, depending on the maximum temperature of exposure during cure with the solid flowable polymer pressure transfer media described below Aluminum is preferred at temperatures up to about 538°0 C. (1000° F.); copper may be used at temperatures between about 538° C. (1000° F.) and about 816° C. (1500° F.) when the aluminum foil would melt. Above about 816° C., high temperature alloys may be used.

A variety of conventional pressure transferring means may be used with this invention such as platen presses, pumps, autoclaves, hydroclaves or the solid flowable polymer media described hereinafter. A vacuum may be drawn on the assembly (e.g., on a breather layer #1581 glass fabric available from T.M.I. Inc., Salt Lake City, Utah) to remove air from the part thus facilitating the resin transfer process and/or densification of the part. Thus, if the vessel which contains the article is airtight, a vacuum may be drawn on it, such as with conventional resin transfer molding using a clam shell press or other suitable apparatus.

A variety of resins (e.g., polymers) can be "transferred" by this process to the article to be molded. Exemplary generic classes include epoxy, phenolic, bismaleimide, pitch, and polyesters.

A variety of porous articles may be resin transfer molded according to this invention (e.g., filament wound, fabric preforms, fiber-layups, carbon-carbon). Exemplary fiber-layups include graphite, carbon, glass and polyamide fibers (e.g., KEVLAR (TM) fiber, E.I. DuPont DeNemours & Co., Wilmington, Del.) Resin transfer as used in this invention also refers to reimpregnation steps to produce carbon-carbon composites.

When used with the solid flowable pressurization media described below, the sponges facilitate the transfer of polymer and/or pitch to a porous carbon-carbon composite, the pressurization thereof, curing and carbonization thereof, in a single step. This continuous operation reduces processing time In addition because the carbon-carbon composite can be evacuated before resin transfer begins and the part is pressurized and carbonized in a continuous process, a better, denser part is made. This results from the fact that there is no opportunity for air or fluids to get into the carbon-carbon part during part movement between operations (e.g., reimpregnation, cure, and carbonization). In addition, reliability is increased because the article is under pressure during the entire operation. Finally, elimination of free-standing postcure and carbonization steps reduce the tendency of delaminations and voids.

The invention is particularly adapted to be used with a solid flowable polymeric pressure transferring media and process for using the same, which is described as follows The preferred pressure causing/transferring means is the solid flowable media and methods described in European Patent Application No. 87630020.4 entitled "Molding Method and Apparatus Using a Solid, Flowable, Polymer Medium" by Kromrey, the disclosure of which is hereby incorporated by reference and in commonly assigned U.S. application Ser. No. 829,048 entitled "Molding Method and Apparatus Using a Solid Flowable, Polymer Medium" now abandoned the disclosure of which is hereby incorporated by reference. The preferred solid flowable polymer material is further described in U.S. Pat. No. 4,686,271 entitled "Hydraulic Silicone Crumb" by Beck et al, the disclosure of which is hereby incorporated by reference. 30 The medium's responsiveness to temperature and pressure coupled with its flowability and solid nature at molding temperatures enable it to be useful. These properties cause the medium to produce an advantageous, substantially uniform, controllable pressure on the surface of the article precursor to be molded. In a typical embodiment of the invention, the polymer is an unfilled silicone rubber particulate of $-4+30$ U.S. mesh sieve size (4.7–0.42 millimeter (mm)), which when pressurized, is sufficiently self-compliant to coalesce as an essentially void-free medium at a pressure of the order of 69 kPa (10 psi).

Typically, a silicone rubber is used as the pressurizing polymer Most preferably, the rubber is an improvement on the type which is described in U.S. Pat. No. 3,843,601 to Braner. See also U.S. Pat. No. 4,011,929 to Jeram et al. The disclosures of both patents are hereby incorporated by reference. Generally, the preferred materials are dimethylsilicones that have vinyl groups. They may be produced by conventional commercial procedures, including production from polysiloxanes using various vulcanizing techniques. Preferred material which has been used thus far are the experimental unfilled silicone rubber materials designated as X5-8017, formerly No. 6360 81 (more simply 8017 hereinafter), and X5-8023 by the Dow Corning Corporation (Midland, Mich.).

Another Dow Corning silicone rubber, No. 93-104, without its ordinary fillers (called "93-104" herein, nonetheless) is useful. The Polygel C-1200 silicone rubber Stauffer Chemical Company, Westport, Conn. USA), believed to be essentially the material which is described in the Bruner U.S. Pat. No. 3,843,601 is also useful with the present invention.

Other preferred materials are the vinylmethylsiloxane-dimethylsiloxane (VMS-DMS) polymers such as Dow Corning No. X5-8026 as described in commonly assigned copending application Ser. No. 907,946 entitled "High Temperature Solid Flowable Polymer Medium and Method of Molding Using the Same", the disclosure of which is hereby incorporated by reference as it is usable at high temperatures, (e.g., 316° C. (600° F.) 482° C. (900° F.)).

Most silicone rubbers are temperature limited for long term use, e.g., typically up to about 232° C. (450° F.). However, silicone resins of the vinylmethylsiloxane and silphenylene types have been successfully tested up to about 482° C. (900° F.). Fillers and other adulterants (such as the metal particulates described below) can be included with and within the medium, provided the essential behavior properties are maintained.

The preferred 8023 silicone rubber is characterized by low strength and high friability. By "high friability" is meant there is such low strength that moderate size solids tend to disintegrate into smaller particulates when subjected to modest mechanical forces, even rubbing between the fingers. The 8017 material has a Shore A hardness of less than 1 (Shore 00 hardness of 50–55) and compressive strength of the order of 70 kPa when measured on a 2.5 cm square by 1.27 cm thick specimen, and upon a compression deformation of about 40%, it shears into smaller particles. This behavior is contrasted with that of more conventional rubbers which have higher strength, greater resistance to deformation and greater elongation to failure. It has also be observed that preferred polymer useful with the present invention forced through a small orifice, or through a 1.1 cm diameter pipe as described below, has a tendency to disintegrate into smaller particulate. By example, it is found that over time, a nominal 30 mesh size powder having about 50 weight percent retained on a 40 mesh screen will change to one having only about 25 weight percent retained on 40 mesh.

The aforementioned behavior of the polymer media enables the fabrication of intricately shaped composite polymer parts with uniform properties under the controlled and independent application of uniform pressure and temperature. In one embodiment of the invention, the polymer has a Shore A hardness of less than about 15, typically less than 8, and desirably less than 1; the compressive strength is less than 1 MPa, and desirably less than 0.2 MPa.

The ability of the inventive medium to flow under molding pressure is believed to be especially reflective of the properties of a good medium. This characteristic allows redistribution of the medium both within and to and from the vessel; it enables control of the absolute level and variability of the pressure. And tests show it is that which distinguishes the materials of the present mediums from those which have been used heretofore in the pressure pad molding technique. The flowability property can inferentially be seen to be analogous to viscosity. But there is no evident standard test known for measuring this property of importance to the invention and therefore a test apparatus was created as described above comprised of a cylinder having downwardly movable piston to test the polymer portion of the medium The cylinder is filled with the rubber or other medium being tested. A replaceable pipe extends from the side of the cylinder and discharges rubber onto a weighing scale, the weight being recorded as a function of time and the pressure applied to the rubber as measured by a transducer. The pipe is a smooth stainless steel tube of 1.1 cm inside diameter and nominally 32–64 RMS (root mean square) surface finish The pipe length is chosen as desired, with 7.6 cm and 15.2 cm being preferred.

Thus, generally it can be said that the polymer will have flowability, i.e., mass transport can occur when molding pressures are applied. The preferred polymer, when tested in the apparatus described above using 10.3 MPa (1500 psi) and a 15.2 cm (6 inch) pipe, has a flow rate of at least 0.6 g/s, typically 6 g/s, and desirably more than 25 g/s.

Further description of the polymer is given below. A particulate elastomer is typically used in the practice of the invention. When the 8017 polymer is used as particulate solids, prior to the application of pressure the particulates are spaced apart at the article precursor surface. But when pressure is applied, the particles self-comply and coalesce into a continuous void-free body. With the addition of a eutectic alloy (or metal), the alloy fuses and conforms to the particle shape. Because of this and their inherent resilience, a uniform hydraulic-like pressure is applied to the article precursor surface. Tests show that the 6360 material without the metal additive will tend to coalesce upon the application of moderate compressive pressure, of the order of 70 kpa; at this point the interfacial boundaries between the particles are so essentially conformed that the compressed rubber becomes translucent instead of opaque. The 8017 material has a true density of 0.97 g/cc, an apparent bulk density of 0.5 g/cc as a −30 mesh size powder, and it is compressed to a coalesced translucent material with a density of 0.94–0.97 g/cc by the application of about 70 kPa. (Further compression of captured material, in the range 70 kPa to 13.8 MPa, shows it to have about 0.4% volume change per 10 MPa.) Under the above-described coalesced condition, there is believed to be little void, or gas (except absorbed gas) contained in the interstices between the particulates.

Thus, the preferred material, when used in particulate form, will be self-compliant and will tend to coalesce as an apparent void-free body below a pressure of 350 kPa, preferably 240 kPa; more preferably about 69 kPa.

Based on various molding tests and material property measurement, desirable results have been associated with medium having low strength, the ability to self-comply under molding level pressures, and the ability to flow and exhibit hydraulic-like behavior. Other silicone rubbers than 8017 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

Tests run on the granular 8017 material showed a maximum variation in pressure of as low as 2% at about 6.9 MPa nominal pressure; other useful materials produced pressure uniform within 10%. Addition of molten metal matrices does not adversely affect the above-cited property.

The usefulness of the materials is also evaluated according to the integrity of a molded finished product, it being well established that inspection will commonly show areas of low density or cracking where the proper application of pressure and temperature has not been achieved, during either the heating or cooling cycle.

The polymer has only been characterized according to the properties of some currently available materials; the data are insufficient to establish that the totality of measured properties in combination are necessary. On the contrary, to a significant extent, it is believed there is a redundancy and that they independently characterize the invention.

Returning to the sponge layers, (that may be used with the above-described pressurizing means) these layers are used in conventional processes to transfer liquids (e.g., polymers) to the article to be molded. Typically, pressure is applied by the means described above and optionally heat is applied to the sponge and article to transfer the resin and cure the part. Typically, pressures of about 0.01 MPa (15 psi) to about 21 MPa (3000 psi) are applied to the sponge to transfer the resin and cure the part. Optionally, the article precursor and the resin filled sponge are exposed to elevated temperatures of about 80° C. to about 350° C. and even higher to facilitate both transfer of the resin (e.g., liquifies the resin) and cure of the part. Undesirable fluids may be vented through a breather layer to a vacuum vented line. The pressures and temperatures vary depending upon the particular article to be cured, its composition, size, etc.

Figure 2:
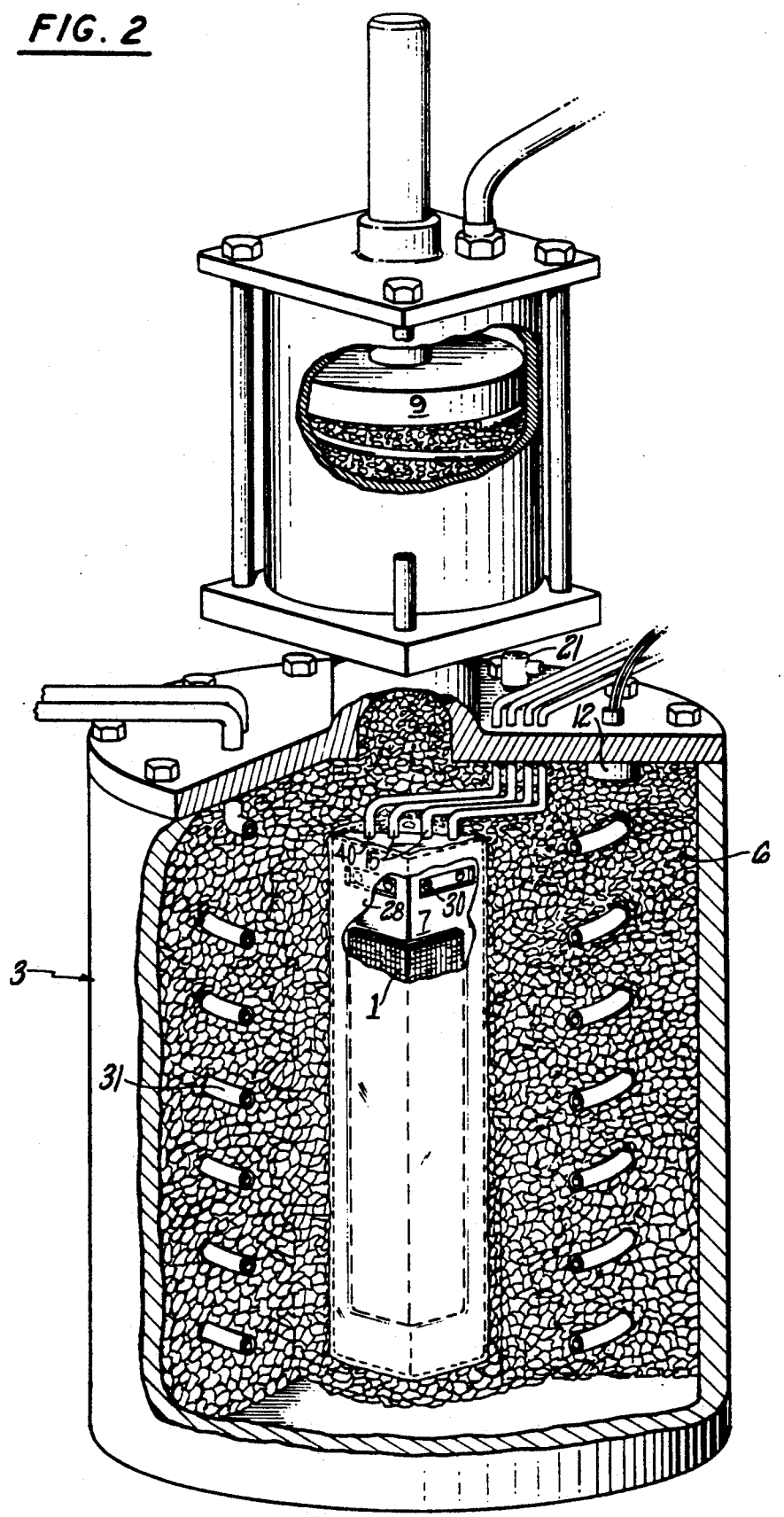
FIG. 2 illustrates a perspective view cutaway of an exemplary apparatus for performing the resin transfer molding method of the present invention.

FIG. 2 illustrates an especially preferred method according to the present invention using the solid flowable media (described earlier) as a pressurizing means. Fiber preforms or woven fabric layups are formed (e.g., by weaving, stitching filament winding and tape wrapping) from dry fibers. The layups are subsequently impregnated with a resin (e.g., phenolic). At least one (1) of the layup plies 1 is placed in contact with the stacked saturated sponge and placed in a pressure vessel 3 (e.g., stainless steel, alloy steel) that surrounded a polymer medium 6. It is preferable to have a barrier layer 28 between the medium and the article to avoid contamination of the composite and medium. Unlike a vacuum bag, this layer does not have to be air tight. An exemplary material is conventional aluminum foil. The barrier layer covers the sponge layer of this invention described earlier. Optionally, a glass fabric or other breather layer which is in communication with a vacuum line 40 via gas vent 30 may be used to remove volatiles from the article. The medium may be in contact with more or less of an exterior or interior composite precursor surface as is desired Typically, the surface area of the composite precursor 1 not in contact with the medium is disposed (e.g., in contact) next to a tool 7 in order to provide (or maintain) a particular shape to the article 1. A pressurizer (e.g., mechanical piston) 9 can apply the requisite, uniformly distributed medium pressure to the article precursor. However, the pressure is preferably accomplished via the thermal expansion of the low temperature polymer medium 6. Such things as conventional pressure transducers 12 can be inserted in various places within the pressure vessel 3 to detect the requisite pressure. While any pressure can be used with the present invention, typically pressures up to 20.67 MegaPascals (MPa) (3000 psi) are used. However, it is believed pressures up to 138 MPa (20,000 psi) could be used.

Resistance heaters 15 are used to form (e.g., cure, carbonize, graphitize, etc.) the composite to be molded 1. By raising the temperature of the tool, the heat is transferred to the article. Preferably, a fluid heating-/cooling means 31 is used to change the pressure via the large thermal expansion of the pressurizing medium. Typically, the temperature used to expand the pressurizing medium is much less than that used to cure the article precursor. Regulation of this pressure increase can be achieved through a relief valve 21, piston 9 and-/or fluid heating/cooling means 31. Thus, tubing 31 can be used alternately to heat or cool the medium depending on whether hot or cold fluids are passed through the tubing to control the pressure independently of the temperature in the cure region.

EXAMPLE

Two 0.635 cm (0.25 in.) thick pieces of AIRWEAVE UHT800 (TM) dacron felt were used as sponges. Each weighed seven (7) grams. 60 grams (A) and 85 grams (B) respectively, of LRF resin (developed by Hercules Inc. under contract to the U.S. Government) were poured onto the sponges. The LRF resin was made from 80 grams of methylene dianiline, 130 grams of Epon 828 (TM) resin (Shell Chemical Co., Houston, Tex.) and 70 grams of ERL (TM) epoxy (Dow Chemical, Midland, Mich.). 3.8 ounce woven fiberglass fabric available from TAP Plastics (San Jose, Calif.) was laid up 20 plies thick resulting in a 78 gram layup. Each layup was covered with ARMALON (TM) Teflon coated glass release fabric available from TMI INC (Salt Lake City, Utah). A layer of glass fabric was placed between each release fabric covered layup and an aluminum mandrel. The glass fabric was in communication with vents in the mandrel to aid in the removal of volatiles. The sponges were placed on top of the release fabric covered layups and aluminum foil was placed over the assembly and taped to the mandrel.

The prepared mold assembly was placed into a pressure vessel for processing. The vessel was filled with 8023 medium. Heating was provided to the tool/mold assembly to properly cure the article. Heating and cooling were also provided to a control coil to maintain the desired pressure conditions. Vacuum was applied when the temperature reached 91° C. (195° F.) to remove volatiles from the assembly since the resin cures at 93° C. (200° F.) The cure cycle was as follows:

| Time (min.) | Temperature | |
|---|---|---|
| | °C. | °F. |
| 0 | 21 | 70 |
| 15 | 93 | 200 |
| 135 | 93 | 200 |
| 145 | 149 | 300 |
| 385 | 149 | 300 |
| 415 | 21 | 70 |

| Time (min.) | Pressure | |
|---|---|---|
| | MPa | psi |
| 0 | 0 | 0 |
| 15 | 9.8 | 1400 |
| 385 | 9.8 | 1400 |
| 415 | 0 | 0 |

The cured panels weighed 94.6 grams A and 94.9 grams B, respectively. This represented a resin content by weight of 17.5% A and 17.8% B respectively. Specific gravities were 2.13 A and 2.14 B. A visual inspection of the panels confirmed that they were strong and void-free.

The resin reservoir facilitates resin transfer molding by providing a resin reservoir that can ensure the desired impregnation of a porous preform such as a dry fiber composite precursor. In addition, the control of placement and size of the resin filled sponge results in more even resin distribution in the finished article. Thus, this invention makes a significant contribution to the field of resin transfer molding.

Although this invention has been shown and described with respect to detailed embodiments thereof, it will be understood by those skilled in the art that various changes in form and detail thereof may be made without departing from the spirit and scope of the claimed invention.

What is claimed is:

1. A method for reimpregnating a carbon-carbon composite by resin transfer molding said composite comprising:
   a) applying pressure to a resin containing, pressure yielding, porous sponge to transfer said resin to a carbon-carbon composite;
   b) applying a vacuum to said carbon-carbon composite to remove fluids from said carbon-carbon composite; and c) curing and carbonizing said resin containing carbon-carbon composite;

wherein said carbon-carbon composite is reimpregnated wherein said sponge comprises a layer disposed adjacent said carbon-carbon composite, said sponge being of organic material and being decomposed and carbonized during said curing and carbonizing step.

2. The method for resin transfer molding as recited in claim 1 wherein said sponge contains about two to about ten times said sponge's weight in resin.

3. The method for resin transfer molding as recited in claim 1 wherein said sponge is about 1.3 mm to about 25.4 cm in thickness.

4. The method for resin transfer molding as recited in claim 1 wherein said pressure is applied by a solid flowable particulate polymer medium capable of transferring a substantially uniform pressure to the carbon-carbon composite.

5. The method for resin transfer molding as recited in claim 1 wherein said sponge is capable of transferring a substantially uniform pressure to the carbon-carbon composite.

6. The method for resin transfer molding as recited in claim 1 wherein a layer of release material is disposed between said sponge and said carbon-carbon composite.

7. The method for resin transfer molding as recited in claim 1 wherein said sponge is felt, fabric, paper, or open cell foam.

8. The method for resign transfer molding as recited in claim 1 wherein said sponge is cotton, nylon, carbon, polyester or dacron.

* * * * *

UNITED STATES PATENT AND TRADEMARK OFFICE
CERTIFICATE OF CORRECTION

PATENT NO. : 5,306,448
DATED : April 26, 1994
INVENTOR(S) : Robert V. Kromrey It is certified that error appears in the above-identified patent and that said Letters Patent is hereby corrected as shown below:

Column 10:

Claim 8, should be cancelled altogether.

Signed and Sealed this

Twenty-seventh Day of September, 1994

Attest:

BRUCE LEHMAN

Attesting Officer  Commissioner of Patents and Trademarks